June 21, 1955   H. L. BOWDITCH   2,711,187
PNEUMATICALLY OPERATED CONTROL APPARATUS
Filed Aug. 21, 1952   3 Sheets-Sheet 1

INVENTOR
Hoel L. Bowditch
BY
Curtis, Morris & Safford
ATTORNEYS

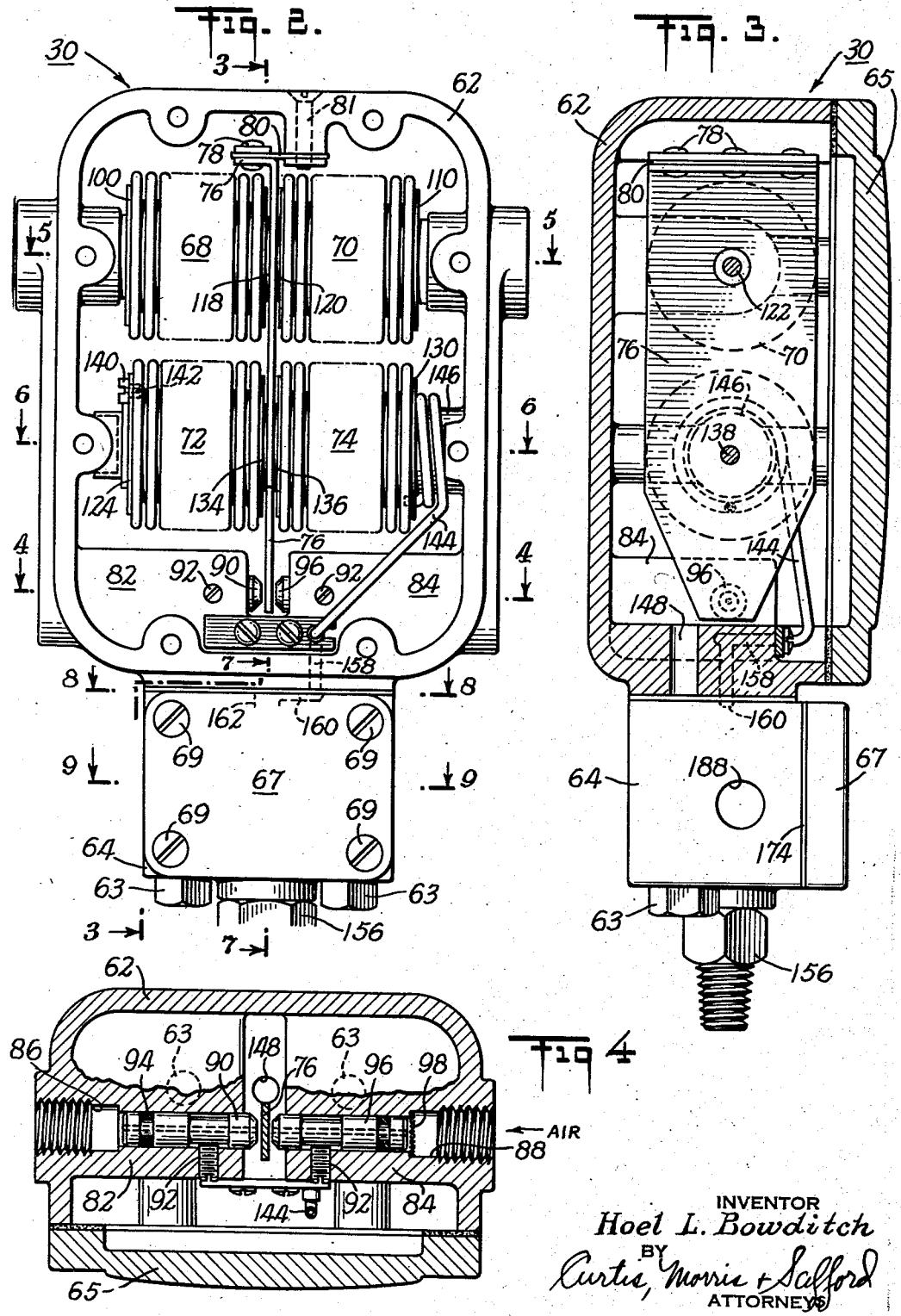

June 21, 1955  H. L. BOWDITCH  2,711,187
PNEUMATICALLY OPERATED CONTROL APPARATUS
Filed Aug. 21, 1952  3 Sheets-Sheet 3
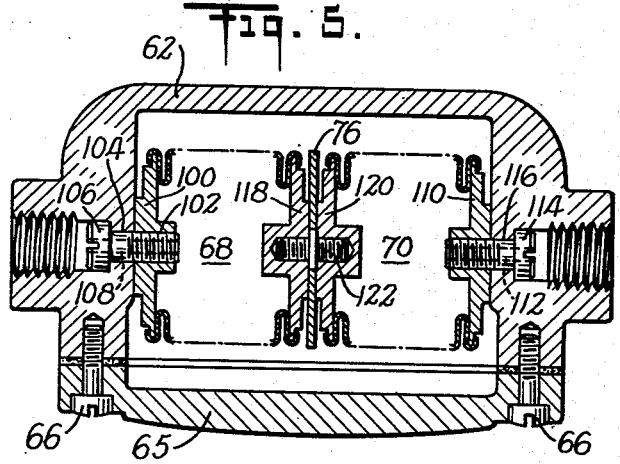
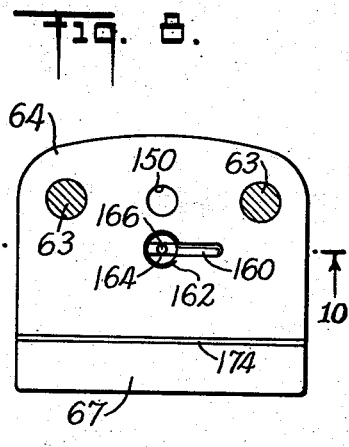
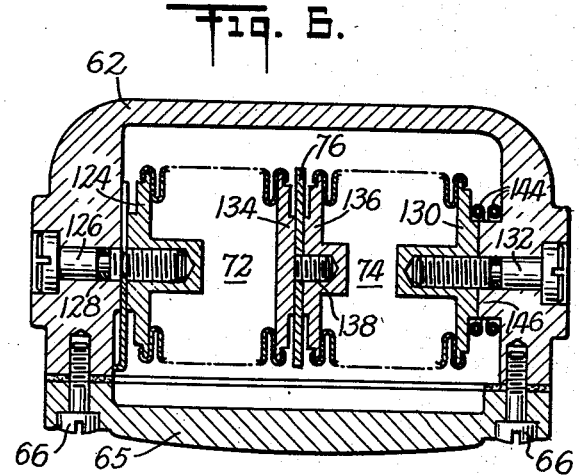
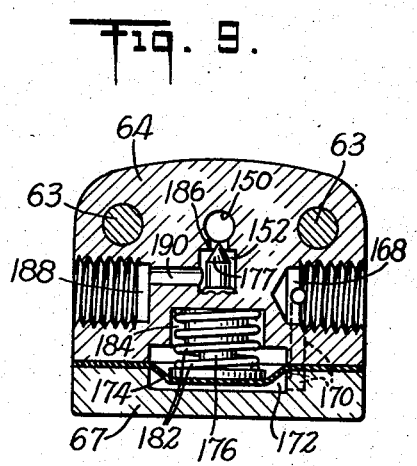
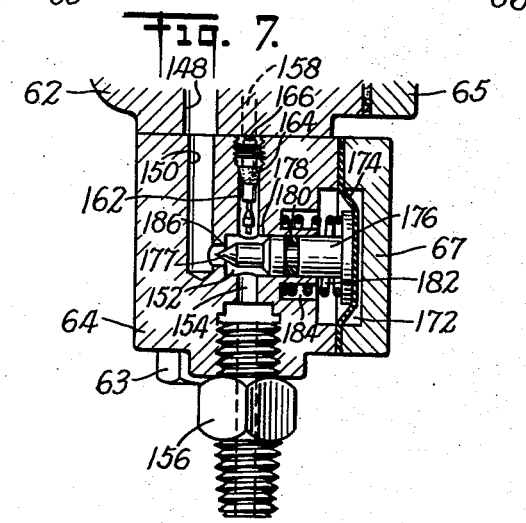
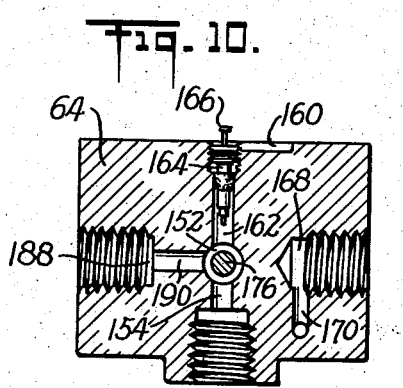
INVENTOR
Hoel L. Bowditch
BY
Curtis, Morris + Safford
ATTORNEYS

United States Patent Office 2,711,187
Patented June 21, 1955

2,711,187

PNEUMATICALLY OPERATED CONTROL APPARATUS

Hoel L. Bowditch, Foxboro, Mass., assignor to The Foxboro Company, Foxboro, Mass., a corporation of Massachusetts Application August 21, 1952, Serial No. 305,670

11 Claims. (Cl. 137—492)

This invention relates to industrial controllers of the type commonly used in measuring and controlling variable process conditions such as temperature, pressure, flow and the like. The controller of the present invention is particularly useful for maintaining the flow of fluid through a pipe at a substantially constant value and will be illustratively described as used for this application, although as the description proceeds it will become apparent that the controller may be used for numerous other types of applications as well.

One common method of controlling fluid flow comprises placing an orifice in the pipe through which the fluid flows, measuring the pressure across the orifice as a measure of the flow through the pipe, and positioning a regulating valve in response to changes in the measured differential pressure to maintain the flow at a desired value. It has been found that in order to achieve optimum control in this way the regulating valve should be placed quite close to the orifice, say about 5–10 pipe diameters from the orifice, and that the valve should be made quite rapidly responsive to changes in the measured value of the flow.

In most process plants the instrument panel is located on an operating platform or floor where it is readily visible and accessible to the operator, and this operating platform is likely to be some distance from the point at which the fluid flow is to be controlled. Thus if a pneumatic control system is to be used and the controller is mounted on the instrument panel it must be connected with the flow measuring device and flow regulating valve by relatively long pipes with the result that transmission of a signal from the flow measuring device to the flow regulating valve is necessarily relatively slow. One way of avoiding this difficulty is to mount the controller near the point at which the flow is to be controlled and provide a recorder on the instrument panel, with suitable connections between the recorder and the portions of the control system near the place where the flow is being controlled. In this way the controller can be connected by short pipes to the measuring device on the one hand and the regulating valve on the other hand and hence the valve can be made rapidly responsive to changes in the measured value of the flow.

It is accordingly an object of the present invention to provide a pneumatically-operated controller that is particularly well adapted for mounting at the place where the variable process condition is being regulated. It is another object of the invention to provide a controller which is exceptionally compact so that it can be conveniently mounted on the pneumatic motor that is commonly associated with and operates the regulating valve. It is still another object of the invention to provide a controller which is simple in construction and capable of causing the regulating valve to be positioned rapidly in response to variations in the measured condition. Other objects of the invention will be in part obvious and in part pointed out hereafter.

The many objects and advantages of the present invention may best be understood and appreciated by referring to the accompanying drawing which illustrates apparatus incorporating a preferred embodiment of the present invention and wherein:

Figure 2 is an elevation of the interior of the controller with the cover plate removed and showing the symmetrical arrangement of the four bellows with respect to the baffle (it should be noted that in Figure 1 the controller is shown essentially in rear elevation);

Figure 3 is a vertical section taken on the line 3—3 of Figure 2 and showing further details of the structure within the controller casing;

Figure 4 is a horizontal section taken on the line 4—4 of Figure 2 and showing the mounting of the nozzles and their relationship to the baffle;

Figure 5 is a horizontal section taken on the line 5—5 of Figure 2 and showing details of the mounting of the upper bellows;

Figure 6 is a horizontal section taken on the line 6—6 of Figure 2 and showing mounting details of the lower bellows;

Figure 7 is a vertical section taken on the line 7—7 of Figure 2 and showing certain of the passages within the flow passage block that is secured to the bottom of the controller casing;

Figure 8 is a horizontal section taken on the line 8—8 of Figure 2 and showing the top of the flow passage block;

Figure 9 is a horizontal section taken on the line 9—9 of Figure 2 and further showing the arrangement of passages within the flow passage block;

Figure 10 is a vertical section taken on the line 10—10 of Figure 8, that is, at right angles to the plane of Figure 7 and further showing details of the passages within the block.

Figure 1:
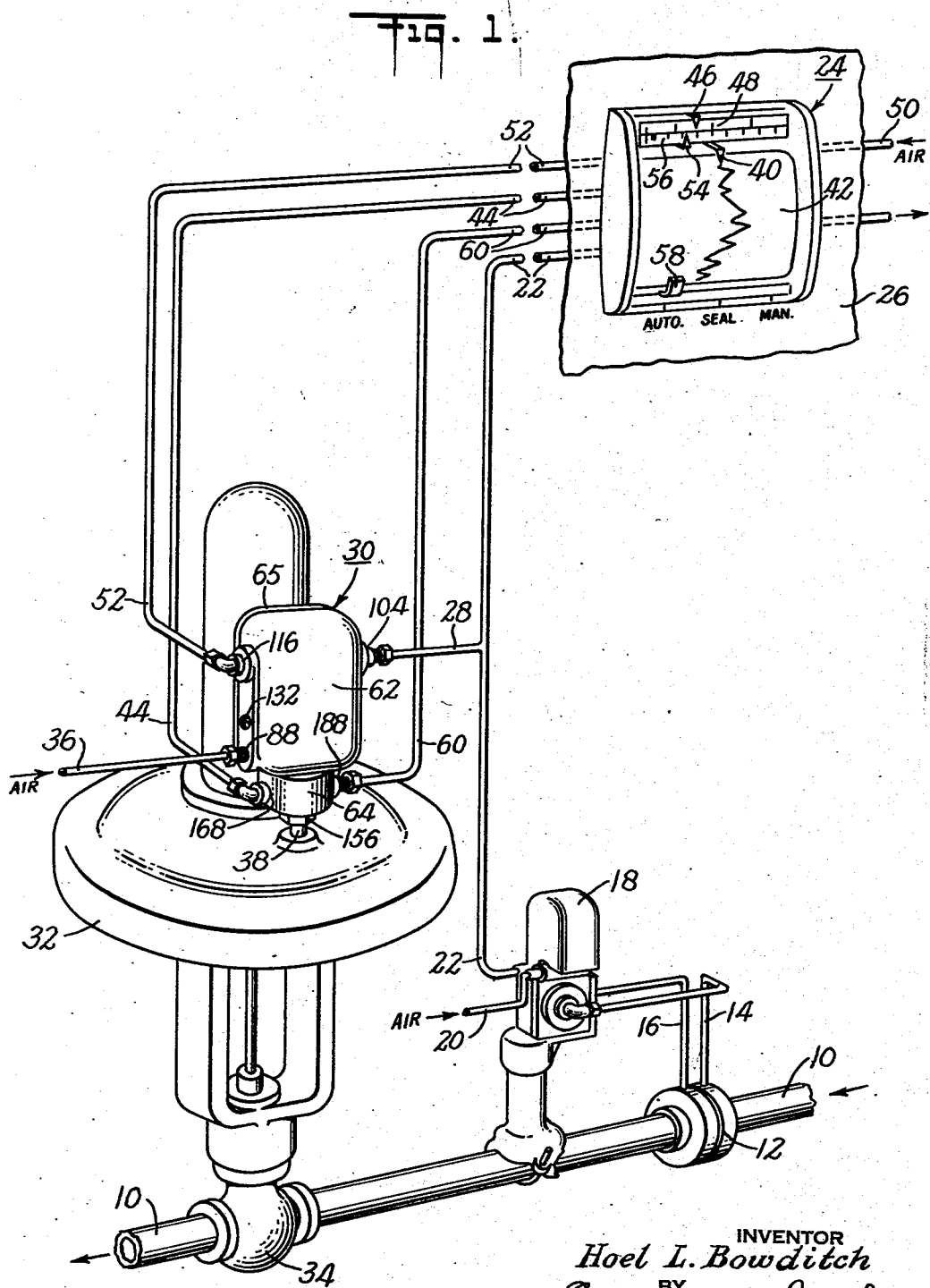
Figure 1 is a schematic showing of the connections between the recorder, flow measuring device, controller and flow regulating valve.

Referring to the drawings and particularly to Figure 1, the numeral 10 designates a pipe through which flows the fluid that is to be maintained at constant flow. Positioned in the pipe 10 is a conventional orifice plate 12 which in the usual manner establishes a pressure drop in the pipe that is related to the flow of fluid therethrough. The pressure upstream and downstream of the orifice 12 is conducted by pipes 14 and 16 to a differential pressure measuring device 18 which may be similar to that shown in Cook Patent 2,539,892 and may be conveniently mounted on pipe 10, as shown. The measuring device 18 is supplied with air under pressure from a suitable source through a pipe 20 and operates to establish in pipe 22 a pneumatic pressure that is proportional to the differential pressure across the orifice plate 12. This output pressure of measuring device 18 is transmitted through a pipe 22 to a recorder 24 mounted on an instrument panel 26 which as previously indicated may be located a considerable distance from the point of measurement and control.

The measuring device output pressure is also conducted through branch pipe 28 to a controller 30, which is mounted on a pneumatic motor 32 of a conventional regulating valve 34 in the pipe 10. The controller is supplied with air under pressure from a suitable source through pipe 36 and operates to establish a pneumatic pressure which is a function of the pressure received through pipe 28 and which is transmitted through a pipe 38 to the pneumatic motor 32 that in turn positions valve 34. The internal structure of controller 30 will be described hereafter.

The recorder 24 forms no part of the invention here claimed and will not be described in detail. However, the recorder performs several different functions that are inter-related with the operations of other portions of the control system and hence it will be desirable to describe in general terms the way in which the recorder operates. Within the housing of the recorder 24 there are two pressure receivers and a pressure transmitter, which may all be of conventional and well-known construction. The pipe 22 is connected to one of these pressure receivers which operates to position a pen 40 with respect to a movable chart 42 to cause a continuous record of the differential pressure (or flow) to be recorded on the chart. The second pressure receiver of the recorder 24 is connected by a pipe 60 to the lower portion of the controller 30 and through pipe 38 with the pneumatic motor 32 in a manner that will be described in detail hereafter. Through these connections the second pressure receiver is thus made responsive to the pressure in the pneumatic motor 32 and operates to position an indicator 46 that is movable with respect to a calibrated reference scale 48 to indicate continuously the value of the valve motor pressure.

The pressure transmitter of the recorder 24 receives air under pressure from a suitable source through pipe 50 and establishes a predetermined but adjustable output pressure that is transmitted through pipe 52 to the upper portion of controller 30. The pressure in pipe 52 is adjustable by manual adjustment of an indicating arm 54 with respect to a calibrated reference scale 56. The indicator 54 and reference scale 56 cooperate to indicate the desired value of flow through pipe 10 (or the desired differential pressure across orifice 12) which value is commonly referred to as the set point of the controller. The pressure in pipe 52 is proportional to this desired value, and hence arm 54 can be manipulated to set controller 30 to maintain the desired flow in pipe 10.

The recorder 24 also includes structure which permits selective adjustment of the control system for automatic or manual operation. This adjustment is performed by a lever 58 near the bottom of recorder 24 which, as shown in Figure 1, is positioned for automatic operation. When lever 58 is shifted to the "seal" position a connection is established between air supply 50 and a pipe 44 leading to the lower portion of controller 30. Pressure applied to controller 30 through pipe 44 operates in a manner described in detail hereafter to shut off the connection between controller 30 and valve motor 32 and thus cause valve 34 to remain in a fixed position.

When lever 58 is shifted to the right-hand or "manual" position indicated in Figure 1, the output pressure of the pressure transmitter of recorder 24 is disconnected from pipe 52 and connected to pipe 60. Thereafter the pressure in valve motor 32 can be manually adjusted by adjustment of indicating arm 54. During manual operation of valve 34 the controller 30 remains disconnected from valve motor 32.

Before turning to a detailed description of the controller 30, it may be desirable to point out that in terms of general mode of operation the present controller is similar to that disclosed in Mason Patent 2,476,104 in that it includes proportioning, derivative and reset features. However it has been found that for applications of the type illustrated in Figure 1 a controller of relatively simple construction can be used. For example, the controller of Mason Patent 2,476,104 includes means whereby the proportioning, derivative and reset effects can be adjusted, whereas as will appear more fully hereafter, in the controller 30 these factors are predetermined and established at particular values which normally remain unchanged during operation of the controller.

Turning now to a consideration of the details of controller 30 and referring particularly to Figure 2 of the drawings, the controller comprises a casing 62 and a flow passage block 64 that are detachably secured together by screws 63 which extend up through the block 64 and are threaded into the bottom of the casing. Referring also to Figures 3 and 5, the casing 62 is provided with a cover plate 65 secured thereto by screws 66. As shown in Figures 2 and 3, block 64 has a cover plate 67 secured thereto by screws 69. Reverting to Figure 2, within the casing 62 there are two pairs of expansible metal bellows 68—70 and 72—74 each of which is fixed to the interior of the casing at its outer end and has an inner movable end that is connected to a baffle 76. At its upper end the baffle 76 is secured by rivets 78 to a flexure 80 which is in turn secured to the interior of casing 62 by a screw 81. Thus the baffle is cantilever-mounted between the bellows and is adapted to move in response to varying pressures established within the bellows.

Referring now to Figure 4 as well as to Figure 2, near the bottom of casing 62 there is a pair of bosses 82 and 84 having the bores 86 and 88 therein. Positioned within the bore 86 there is a nozzle 90 that is held in place by a set screw 92. Nozzle 90 is provided with an O-ring gasket 94 which is located in an annular groove in the nozzle and establishes a seal between the nozzle and the interior of bore 86. A nozzle 96 similar to the nozzle 90 is positioned within the bore 88. The inner ends of nozzles 90 and 96 are positioned close to but slightly spaced from the lower end of baffle 76 when the baffle is in that position which it occupies with equal pressures in all of the bellows 68–74. Nozzle 96 is supplied with air under pressure from pipe 36 (see Fig. 1) which is connected to the outer threaded end of bore 88 to cause air to flow through a screen 98 and into the nozzle 96. The bore 86 is left open to atmosphere and thus nozzle 90 is in communication with the atmosphere. Variations in pressure in bellows 68–74 cause the baffle 76 to move against one or the other of nozzles 90 and 96 to increase or decrease the air pressure within the casing 62 as will be described in further detail hereafter.

Referring now to Figure 5 of the drawings which shows details of the constructions of the upper bellows 68 and 70, the bellows 68 has an end plate 100 having a central threaded bore 102 therethrough. The bore 102 of plate 100 registers with a bore 104 formed in the casing 62 and having an enlarged outer portion that is internally threaded to receive one end of pipe 28 (shown in Figure 1). The plate 100 is secured to casing 62 by means of a screw 106 which passes through bore 104 and is threaded into the bore 102, thereby securing one end of the bellows to the casing. Screw 106 has a central passage 108 therethrough to provide communication between the interior of bellows 68 and pipe 28. Thus bellows 68 is responsive to the output pressure of measuring device 18.

Bellows 70 has an end plate 110 that is secured to casing 62 by a screw 114 in the same manner as plate 100 of bellows 68. Bellows 70 communicates through a passage 112 in screw 114 and through bore 116 with pipe 52 (see Figure 1). Thus the bellows 70 is responsive to the set point pressure transmitted from recorder 24.

Bellows 68 and 70 are also provided with the inner end plates 118 and 120 respectively that are secured to each other and to the baffle 76 by means of a double-ended screw 122 that passes through the baffle 76 and is threaded into the end plates 118 and 120 respectively. Thus the inner ends of bellows 68 and 70 are secured to the baffle and move therewith.

Referring now to Figure 6, the bellows 72 and 74 are mounted in a manner generally similar to that of bellows 68 and 70. Thus the end plate 124 of bellows 72 is secured to casing 62 by means of a screw 126. However, the screw 126 has no passage therethrough and is provided with an O-ring gasket 128 to prevent escape of air between screw 126 and the bore in which it is positioned.

Bellows 74 has an end plate 130 that is secured to the casing 62 by means of a screw 132 similar to the screw 126. The inner end plates 134 and 136 of the bellows 72 and 74, respectively, are secured to each other and to the baffle 76 by means of a screw 138 which is secured to end plate 134, passes through the baffle 76 and is threaded into end plate 136.

The bellows 72 and 74 are in restricted communication with the interior of casing 62. Reverting to Figure 2, threaded into the fixed (left-hand) end plate of bellows 72 there is a small screw 140 having a capillary passage 142 therethrough to establish restricted communication between the interior of bellows 72 and the interior of casing 62. The bellows 74 is connected to one end of a capillary tube 144 that passes several times around the hub 146 of bellows 74 and then extends downwardly in the casing 62 to the block 64. Passages are provided within the block 64, as described hereafter, which provide communication between the lower end of capillary tube 144 and the interior of casing 62. The resistance to flow provided by capillary tube 144 is considerably greater than that provided by restriction 142 of bellows 72. Thus as the pressure within the casing 62 changes, the pressure in bellows 74 changes more slowly than the pressure within bellows 72, for reasons that will be described more fully hereafter.

Referring now to Figures 3 and 7 of the drawings, the interior of casing 62 is connected with the valve motor 32 (see Figure 1) in the following manner: In the bottom of casing 62 there is a passage 148 that registers with passage 150 of block 64. Passage 150 communicates at its lower end with a cross-passage 152 that in turn leads to a vertical passage 154 which extends down through a nipple 156 threaded into the bottom of block 64. The nipple 156 is adapted to be threaded into the top of valve motor 32, thereby mounting the controller 30 on the valve motor and establishing communication between the interior of casing 62 and the interior of the valve motor through passages 148, 150, 152 and 154.

Still referring to Figures 3 and 7 and also referring to Figures 8 and 10, the capillary tube 144, which as previously described communicates with the interior of bellows 74 is connected with the cross-passage 152 within block 64 in the following manner: As shown in Figure 3, the lower end of tube 144 is connected to an L-shaped passage 158 formed in the bottom of casing 62. The lower end of passage 158 registers with a groove 160 formed in the upper surface of block 64. As best shown in Figure 10, the groove 160 extends laterally to a vertical bore 162 which communicates at its lower end with the cross-passage 152. Mounted within the bore 162 there is a small shut-off valve 164 having a valve member 166 that is spring-biased in an upward direction. As indicated in Figure 10, when valve 164 is closed the valve member 166 extends above the upper surface of block 64. The function of valve 164 is to shut off bore 162 when the casing 62 is removed from block 64, thereby preventing leakage of air from the valve motor 32 under these circumstances. In normal operation the block 64 and casing 62 are bolted together as previously described and hence the valve 164 is normally open. Under these circumstances communication is established between the interior of bellows 74 and the interior of casing 62 through tube 144, groove 160, valve 164, passage 162, cross-passage 152 and passages 150 and 148. The reason for such an indirect connection between the bellows 74 and casing 62 will be pointed out hereafter.

Referring now to Figures 1 and 9 of the drawings, it has been previously pointed out that when the lever 58 of recorder 24 is shifted to the "seal" or "manual" position, air pressure is transmitted through pipe 44 to the controller 30 to close off the connection between controller 30 and valve motor 32. Referring particularly to Figure 9, the lower end of pipe 44 is connected to the threaded bore 168 of block 64. From the bore 168, air pressure is conducted through a passage 170 formed in block 64 and cover plate 67 to a chamber 172 defined by a recess formed in the cover plate and a flexible diaphragm 174 interposed between the cover plate 67 and block 64. Referring also to Figure 7, on the inner side of diaphragm 174 there is a valve member 176 slidable in a bore 178 of the block 64. The valve member 176 is provided with O-ring gasket 180 that seals the valve member with respect to bore 178 and is urged outwardly by a spring 182 which at one end bears against the head of valve member 176 and at its other end is seated in an annular groove 184 formed in the block 64. During automatic operation of the controller the valve member 176 is positioned as shown in Figure 7 to permit communication between passages 150 and 154 within the block 64. However, when the lever 58 of recorder 24 is shifted to the "seal" or "manual" position, and pressure is applied to pipe 44 this pressure is conducted to the chamber 172 to move valve member 176 to the left and cause its pointed left end 177 to bear against a shoulder 186 in passage 152, thereby shutting off passage 150.

It has been previously explained that pipe 60 is connected at one end to a pressure receiver within the recorder 24 in such manner that the indicator 46 indicates the pneumatic pressure in the pneumatic motor 32 of the valve 34. Referring to Figures 9 and 10, pipe 60 is connected with the threaded bore 188 of block 64 and communicates through a passage 190 with the cross-passage 152 near the center of the block. Thus pipe 60 communicates with passage 154 and through nipple 156 with the valve motor 32. Hence in normal operation the indicator 46 is continuously responsive to the pressure within the valve motor 32.

As previously described, when lever 58 is shifted to manual position, indicator 46 becomes inoperative and pipe 60 is connected to the pressure transmitter within recorder 24, the output pressure of which is determined by the setting of lever 54. Thus for manual operation, the lever 54 is adjusted to the desired point on scale 56, and the pressure transmitter transmits a corresponding pressure through pipe 60 which is conducted through passages 190, 152, 154 and 156 to the valve motor. In this way the position of valve 34 can be manually adjusted. When lever 58 is returned from the manual position to the automatic position, indicator 46 again becomes operative to indicate the pressure within valve motor 32 and the pressure in pipe 44 is released to cause the valve 176 to open, thereby re-establishing communication between casing 62 and the valve motor.

Usually when this shift from manual to automatic operation takes place the pressure existing in casing 62 will be somewhat different from the valve motor pressure and it has been found that there is a tendency toward discontinuity of control until these pressures have been equalized. Since the passage 148 is relatively large, rapid equalization occurs between the casing pressure and valve motor pressure. Moreover, the restriction 142 of bellows 72 has a relatively low resistance and hence the casing pressure and the pressure within bellows 72 can equalize relatively rapidly. However, bellows 74 is associated with a relatively high resistance capillary 144 and hence pressure equalization through this resistance may require considerable time. In order to avoid discontinuity due to this delayed equalization, the interior of bellows 74, as previously described, is connected through tube 144, groove 160 and passage 162 with the cross passage 152. With this construction the interior of bellows 74 communicates with the valve motor 32 even when the valve 176 is closed and hence upon a shift from manual to automatic operation the interior of bellows 74 is already at the valve motor pressure. In this way, undesirable discontinuities in control can be avoided.

The general operation of the control system of Figure 1 should be apparent from the foregoing description. The operation of controller 30 in particular will now be described: It will be recalled that the pressure in bellows 70 is representative of the set point of the controller, that is, the value at which the flow through pipe 10 is to be maintained. The pressure in bellows 68 is proportional to the measured value of the flow in pipe 10. The baffle 76 is positioned by the four bellows and its lower end constitutes a baffle adapted to restrict flow from one or the other of nozzles 90 and 96. The spacing between the inner ends of nozzles 90 and 96 is such that maximum motion of the lower end of baffle 76 is only a very small fraction of an inch, say .008 inch in a typical case. Therefore, since as described below the bellows operate to maintain baffle 76 in an operative position between the nozzles, the net force exerted on the baffle by the four bellows is always substantially zero.

It will be initially assumed for illustrative purposes (1) that the pressures in bellows 68 and 70 are equal (2) that the pressures in bellows 72 and 74 are equal and also that they are equal to the casing pressure (3) that the distance between the center of bellows 72 and 74 and the pivot of baffle 76 is 2½ times as great as the distance between the centers of bellows 68 and 70 and the pivot of flexure 76, (4) that an increase in flow through pipe 10 causes device 18 to increase pressure in pipe 22 (5) that an increase in pressure in valve motor 32 tends to open valve 34 and (6) that the resistance of capillary tube 144 is approximately 8 times that of restriction 142 and (7) that the flow increases in pipe 10 in such a way as to cause a rapid increase in pressure of 2½ lbs./sq. in. in pipe 22. With the assumed pressure increase in pipe 22, the pressure in bellows 68 starts to increase whereas the pressure in bellows 70 remains unchanged and hence baffle 76 is moved toward supply nozzle 96 and the pressure in casing 62 starts to decrease. As the pressure within the casing starts to decrease air flows from bellows 72 and 74 through the restrictions 142 and 144 respectively, into the casing. However, since the resistance of restriction 142 is substantially less than that of tube 144 the pressure in bellows 72 drops much more rapidly than that in bellows 74 and a pressure difference is established between bellows 74 and 72 that tends to oppose the pressure difference between bellows 68 and bellows 70. The casing pressure continues to drop until a pressure difference is established between bellows 74 and 72 that is just sufficient to balance the pressure difference between bellows 68 and 70, whereupon the baffle moves away from supply nozzle 96. For the assumed bellows spacing this balance is reached when the pressure difference between bellows 74 and 72 reaches 1 lb./sq. in. The decrease in casing pressure decreases the pressure in valve motor 32, thereby tending to close valve 34 and reduce the flow through pipe 10. The action just described is the "proportional" action of the controller and with the assumed spacing of the bellows pairs provides a proportional band of 250%.

In order to produce a pressure differential of one pound per square inch between bellows 74 and 72, the pressure in the casing must drop substantially more than one pound to provide the necessary pressure differential across the restrictions 142 to cause air to flow out of bellows 72. This relatively large drop in casing pressure persists only momentarily since the pressure in bellows 72 and the casing pressure rapidly equalize. The amount by which the casing pressure drops below the pressure in bellows 72 is a function of the size of the restriction 142 and determines the magnitude of the "derivative" action of the controller.

The difference in pressure between the casing 62 and bellows 74 causes air to flow out of the bellows 74 through tube 144 and the pressure in bellows 74 gradually decreases. Since the pressure difference between bellows 72 and 74 must remain at that value necessary to balance the force exerted on the baffle 76 by the upper bellows due to unbalanced pressures therein, the decrease in pressure in bellows 74 in turn causes a further decrease in the casing pressure and in the pressure in bellows 72. Hence, so long as the pressure in bellows 68 remains higher than the pressure in bellows 70, the bellows 72 and 74 will cause the casing pressure to continue to decrease. The rate at which the presure drops within bellows 74 is a function of the resistance of tube 144. The action just described is the "reset" action of the controller.

As indicated above, the decrease in pressure in the casing 62 causes a corresponding decrease in pressure in the valve motor 32 thereby closing the valve somewhat to reduce the flow through pipe 10. The flow will thus eventually be reduced to the point where pressure in bellows 70 again equals the pressure in bellows 78, at which time the pressures in bellows 72 and 74 will again be equal. The casing pressure may return to the same value that it had before the upset occurred, but usually it will have a different value when a new balance has been established.

It will be apparent that a change in flow through pipe 10 which produces a decrease in pressure in bellows 68 will cause the above-described operations to occur in a reverse sense.

From the foregoing description it should be apparent that the present invention provides a controller capable of satisfying the several objects set forth at the beginning of the present specification. Taking into account the fact that the controller embodies proportional derivative and reset features, it is unusually simple in construction and compact. It can readily be made of such size as to permit mounting on the pneumatic motor associated with the conventional regulating valve and connected to the measuring device by short pipes. Hence it can be made very rapidly responsive to changes in the measured condition.

In the present structure the four bellows are, in effect, housed inside of a pneumatic relay and hence the need for a separate relay with its diaphragm, nozzles, and pilot valve is eliminated. The interior of the casing is continuously purged because of the air flow therethrough. Also the action of the controller can be readily reversed by reversing the measurement pressure and set point pressure connections.

It is of course to be understood that the foregoing description is illustrative only and that numerous changes can be made in the specific embodiment described without departing from the spirit of the invention as defined in the appended claims.

I claim:

1. In pneumatically operated control apparatus for maintaining a variable condition at a desired value, in combination, an air-tight casing, a pair of opposed nozzles mounted in said casing, one of said nozzles communicating with the atmosphere and the other nozzle being adapted to be connected to a pressure fluid source, a baffle mounted between said nozzles and movable with respect thereto to vary the flow of fluid therethrough, a pair of bellows mounted within said casing and each having a movable end connected to said baffle, said bellows being constructed and arranged to exert opposing forces on said baffle, each of said bellows communicating with the interior of said casing and at least one of said bellows being in restricted communication with the interior of said casing, and means mounted within said casing for exerting on said baffle a force proportional to the departure of said variable condition from said desired value, whereby said bellows, baffle and nozzles cooperate to establish in said casing a pneumatic pressure that is a predetermined function of the value of said condition.

2. In pneumatically operated control apparatus for maintaining a variable condition at a desired value, in combination, an air-tight casing, a pair of opposed nozzles mounted in said casing, one of said nozzles communicating with the atmosphere and the other nozzle being adapted to be connected to a pressure fluid source, a baffle mounted between said nozzles and movable with respect thereto to vary the flow of fluid therethrough, a first and second opposed bellows mounted within said casing and each having a movable end connected to said baffle, said first bellows being adapted to be made effectively responsive to said desired value and said second bellows being adapted to be made effectively responsive to the value of said variable condition, a third and fourth opposed bellows mounted within said casing and each having a movable end connected to said baffle, said third and fourth bellows communicating through restrictions with the interior of said casing and the restriction of said fourth bellows having a substantially greater resistance than the restriction of said third bellows, whereby said bellows, baffle and nozzles cooperate to establish in said casing a pneumatic pressure that is a predetermined function of the value of said condition.

3. In pneumatically operated control apparatus for maintaining a variable condition at a desired value, in combination, an air-tight casing, a baffle movably mounted in said casing, a pair of opposed bellows mounted in said casing on opposite sides of said baffle, and each having a movable end connected to said baffle, said bellows communicating with the interior of said casing and at least one of said bellows being in restricted communication with the interior of said casing, a pair of nozzles mounted in said casing on opposite sides of and close to said baffle, one of said nozzles being connectable with an air pressure source, and the other nozzle communicating with the atmosphere, and means mounted within said casing for exerting on said flapper a force proportional to the departure of said variable condition from said desired value to move the flapper, whereby said bellows, flapper and nozzles cooperate to establish in said casing a pneumatic pressure that is a predetermined function of the value of said condition.

4. In pneumatically operated control apparatus for maintaining a variable condition at a desired value, in combination, an air-tight casing, a baffle mounted for pivoting movement in said casing, a pair of opposed bellows mounted in said casing on opposite sides of said baffle, each of said bellows having a movable end bearing against said baffle and communicating with the interior of said casing through a restriction, the restriction associated with one of said bellows having a substantially greater resistance than that associated with the other of said bellows, a pair of nozzles mounted in said casing on opposite sides of and close to said baffle, one of said nozzles being adapted to be connected to a source of air under pressure and the other nozzle communicating with the atmosphere, and means mounted within said casing for exerting on said baffle a force proportional to the departure of said variable condition from said desired value, whereby said bellows, baffle and nozzle cooperate to establish in said casing a pneumatic pressure that is a predetermined function of the value of said condition.

5. In pneumatically operated control apparatus for maintaining a variable condition at a desired value, in combination, an air-tight casing, a baffle mounted for pivoting movement in said casing, a first and second substantially aligned bellows mounted in said casing on opposite sides of said baffle, each of said bellows having a movable end bearing against said baffle and being fixed to the casing at its other end, said first bellows being adapted to be made effectively responsive to said desired value and said second bellows being adapted to be made responsive to the value of said variable condition, a third and fourth bellows mounted in said casing on opposite sides of said baffle and each having a movable end bearing against said baffle, said third and fourth bellows communicating with the interior of said casing and at least one of said third and fourth bellows being in restricted communication with the interior of said casing, and a pair of nozzles mounted in said casing on opposite sides of and close to said baffle, one of said nozzles being connectable to a source of air under pressure and the other nozzle communicating with the atmosphere, whereby said four bellows, baffle and nozzle cooperate to establish in said casing a pneumatic pressure that is a predetermined function of the value of said condition.

6. In pneumatically operated control apparatus for maintaining a variable condition at a desired value, in combination, an air-tight casing, a baffle cantilever-mounted in said casing, a first and second substantially aligned bellows mounted in said casing on opposite sides of said baffle, each of said bellows being fixed to said casing at one end and having a movable end bearing against said baffle, said first bellows being adapted to be made effectively responsive to said desired value and said second bellows being adapted to be made effectively responsive to the value of said variable condition, a third and fourth axially aligned bellows mounted in said casing on opposite sides of said baffle and having a movable end bearing against said baffle at a point spaced from the bearing point of said first and second bellows, said third and fourth bellows communicating through restrictions with the interior of said casing and the restriction of said fourth bellows having a substantially greater resistance than the restriction of said third bellows, and a pair of nozzles mounted in said casing on opposite sides of and close to the flapper, one of said nozzles being connectable to an air pressure source and the other nozzle communicating with the atmosphere, whereby said bellows, baffle and nozzles cooperate to establish in said casing a pneumatic pressure that is a predetermined function of the value of said condition.

7. Control apparatus according to claim 6 and wherein said first and second bellows, said third and fourth bellows, and said nozzles are positioned at successively more remote points from the point of attachment of said baffle to said casing.

8. In a pneumatically operated control apparatus for maintaining a variable condition at a desired value, in combination, an air-tight casing, a baffle movably mounted in said casing, a first and second substantially aligned bellows mounted in said casing on opposite sides of said baffle and each having a movable end connected to said baffle, said first bellows being in direct but restricted communication with the interior of said casing, a pair of nozzles mounted in said casing on opposite sides of said baffle and close thereto, one of said nozzles being connectable to an air pressure source and the other nozzle communicating with the atmosphere, means mounted within said casing for exerting on said baffle a force proportional to the departure of said variable condition from said desired value, a regulating valve and pneumatic motor for operating the same, a conduit interconnecting said pneumatic motor and the interior of said casing and valve means associated with said conduit for selectively closing said conduit at an intermediate point thereof, said second bellows being connected by a restricted passage with said conduit between said intermediate point and said pneumatic motor whereby said second bellows communicates with said casing only when said valve means is open.

9. In a pneumatically operated control apparatus for maintaining a variable condition at a desired value, in combination, a regulating valve for varying the application of an agent affecting said variable condition, a pneumatic motor for operating said valve, a flow passage block mounted on said pneumatic motor, an air-tight casing detachably secured to said flow passage block, a pair of opposed nozzles mounted in said casing, one of said nozzles communicating with the atmosphere and the other nozzle being adapted to be connected to a pressure fluid source, a baffle mounted between said nozzles and movable with respect thereto to vary the flow of fluid therethrough, a pair of bellows mounted within said casing and each having a movable end connected to said baffle, said bellows being constructed and arranged to exert opposing forces on said baffle, each of said bellows communicating with the interior of said casing and at least one of said bellows being in restricted communication with the interior of said casing, and means mounted within said casing for exerting on said baffle a force proportional to the departure of said variable condition from said desired value, whereby said bellows, baffle and nozzles cooperate to establish in said casing a pneumatic pressure that is a pre-determined function of the value of said condition, said flow passage block including a conduit interconnecting the interior of said casing and said pneumatic motor and a pressure responsive shut-off valve positioned to selectively close said conduit to permit detachment of said sealed casing from said flow passage block without releasing the pressure in said pneumatic motor.

10. In a pneumatically operated control apparatus for maintaining a variable condition at a desired value, in combination, a regulating valve for varying the application of an agent affecting said variable condition, a pneumatic motor for operating said valve, a flow passage block mounted on said pneumatic motor, an airtight casing detachably secured to said flow passage block, a pair of opposed nozzles mounted in said casing, one of said nozzles communicating with the atmosphere and the other nozzle being adapted to be connected to a pressure fluid source, a baffle mounted between said nozzles and movable with respect thereto to vary the flow of fluid therethrough, a pair of bellows mounted within said casing and each having a movable end bearing against said baffle, said bellows being constructed and arranged to exert opposing forces on said baffle, one of said bellows communicating directly with the interior of said casing and the other of said bellows communicating indirectly with the interior of said casing, and means mounted within said casing for exerting on said baffle a force proportional to the departure of said variable condition from said desired value, said flow passage block including a first passage connecting the interior of said casing with said pneumatic motor, a shut-off valve positioned to close said first passage to permit detachment of said casing without release of pressure from said pneumatic motor, and a second passage communicating through a restriction with the interior of said other bellows and connected to said first passage at a point between said shut-off valve and said pneumatic motor.

11. Control apparatus according to claim 10 and wherein the second passage of said flow passage block is provided with a shut-off valve having a part spring biased to engage said sealed casing, whereby when said casing is detached from said flow passage block said second passage is closed by said shut-off valve to prevent release of pressure from said pneumatic motor.

References Cited in the file of this patent

UNITED STATES PATENTS

| | | |
|---|---|---|
| 2,369,887 | Eckman | Feb. 20, 1945 |
| 2,476,104 | Mason | July 12, 1949 |